(12) United States Patent
Braeuchle et al.

(10) Patent No.: US 7,233,848 B2
(45) Date of Patent: Jun. 19, 2007

(54) LANE-CHANGE ASSISTANT FOR MOTOR VEHICLES

(75) Inventors: Goetz Braeuchle, Reichartshausen (DE); Juergen Boecker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 288 days.

(21) Appl. No.: 10/507,445

(22) PCT Filed: Oct. 9, 2002

(86) PCT No.: PCT/DE02/03808

§ 371 (c)(1),
(2), (4) Date: Mar. 9, 2005

(87) PCT Pub. No.: WO03/076249

PCT Pub. Date: Sep. 18, 2003

(65) Prior Publication Data

US 2005/0155808 A1 Jul. 21, 2005

(30) Foreign Application Priority Data

Mar. 12, 2002 (DE) .............................. 102 10 723

(51) Int. Cl.
*G06F 7/00* (2006.01)
*B60Q 1/34* (2006.01)

(52) U.S. Cl. ........................................ 701/36; 340/475

(58) Field of Classification Search .................. 701/36; 340/475, 425.5, 435–438; 463/63
See application file for complete search history.

(56) References Cited

U.S. PATENT DOCUMENTS

| | | | |
|---|---|---|---|
| 6,804,604 B2 * | 10/2004 | Yamazaki | 701/211 |
| 2001/0018641 A1 | 8/2001 | Shinmura et al. | |
| 2005/0155808 A1 * | 7/2005 | Braeuchle et al. | 180/402 |
| 2005/0280518 A1 * | 12/2005 | Bartels et al. | 340/435 |
| 2006/0009910 A1 * | 1/2006 | Ewerhart et al. | 701/301 |
| 2006/0038108 A1 * | 2/2006 | Belau | 250/208.1 |

FOREIGN PATENT DOCUMENTS

DE 197 25 656 1/1998

* cited by examiner

*Primary Examiner*—Yonel Beaulieu
(74) *Attorney, Agent, or Firm*—Kenyon & Kenyon LLP

(57) ABSTRACT

Lane changing assistant for motor vehicles, controlling an automatic changing of the vehicle to a neighboring lane in response to a command by the driver as part of a lane keeping system of the motor vehicle and having an operating element that is movable in opposite directions out of a neutral position, wherein a sensor is assigned to the operating element for each adjustment direction and the sensor supplies a multi-valued output signal which corresponds to the operation of the operating element and determines the dynamics of the lane changing procedure.

6 Claims, 1 Drawing Sheet

LANE-CHANGE ASSISTANT FOR MOTOR VEHICLES

FIELD OF THE INVENTION

The present invention a lane changing assistant which controls an automatic changing of the vehicle to a neighboring lane in response to a command by the driver as part of a lane keeping system; and an operating element which is movable from a neutral position into opposite directions.

BACKGROUND INFORMATION

Systems which support the driver in driving the vehicle or facilitate special driving maneuvers (advanced driver assistance systems; ADAS) are being used to an increasing extent in motor vehicles. One function of such systems is lane keeping support (LKS) in which the actual position of the vehicle in relation to the lane in which it is driving is determined and compared with a setpoint which typically corresponds to the center of the lane. The output signal then includes an actuator signal for an actuator which intervenes in the steering system of the vehicle, whether to support the driver by an additional steering torque or to perform a completely autonomous lane keeping which no longer requires any intervention by the driver.

In addition to this lane keeping support, which is used to keep the vehicle in the lane in which it is driving at the moment, there are also known lane changing assistants which are activated on command by the driver, e.g., when a passing maneuver is to be initiated or terminated and which support the driver in changing lanes or automatically support the lane change. This operating element is used for input of the lane changing command. After the lane changing command has been entered, the lane changing operation runs in automatic operation according to a fixedly predetermined program, but this often does not conform to the driver's actual intent.

SUMMARY OF THE INVENTION

An object of the present invention is to create a lane changing assistant which permits the sequence of the lane changing operation to be better adapted to the driver's intent.

This object is achieved according to the present invention by the fact that a sensor is assigned to the operating element for each adjustment direction and the sensor supplies a multi-valued output signal corresponding to the operation of the operating element, and this output signal determines the dynamics of the lane changing operation.

The term "dynamics of the lane changing operation" refers to the speed with which the lane change is completed. With low dynamics, the lane changing operation extends over a longer period of time and the steering angle remains relatively small, so that the transverse acceleration of the vehicle which occurs in changing lanes remains low accordingly. This permits lane changing with a great convenience in traffic situations in which a sufficient amount of time is available for changing lanes. However, a more dynamic lane changing operation is required in other traffic situations, e.g., when a vehicle to be passed in front brakes suddenly, i.e., the vehicle changes to the next lane more rapidly and therefore higher transverse accelerations occur. The present invention offers the driver the option of controlling the dynamics of the lane changing operation as desired.

The multi-valued output signals of the sensors assigned to the operating element may be analog signals or multi-valued digital signals which represent the adjustment path, the adjustment force or the torque exerted by the driver on the operating element.

The lane keeping support system includes essentially an electronic regulator which receives from a sensor device, e.g., an electronic camera system, a signal which represents the actual position of the vehicle in relation to the boundaries of the lane in which it is traveling. The regulator compares the actual position with a setpoint value which corresponds to the center of the lane, for example, and outputs as the output signal an actuator command to a final control element for the steering of the vehicle, so that the transverse position of the vehicle is regulated at the setpoint value. The main component of the lane changing assistant is a function module of this regulator, which is formed by software and/or hardware and changes the setpoint value suddenly or steadily to a value corresponding to the side lane. In addition, it is also possible to provide control components using which the control command output by the regulator is modified to control the steering movements, i.e., the transverse position of the vehicle in the transitional phase while changing lanes.

The dynamics of the lane changing operation may be influenced in various ways, e.g., by the speed at which the setpoint changes, by limiting the steering angle, which is determined by the output signal of the regulator, or by direct modification of this output signal. The control algorithm for the lane keeping support is frequently designed so that a measured setpoint/actual deviation within a certain driving distance, called the forecast distance, is reduced to zero. The forecast distance is at least dependent upon speed and therefore is preferably given in the form of a time interval, the forecast time which is equal to the quotient of the forecast distance and the absolute speed of the vehicle. With a short forecast time, the steering deflection must be more intense to regulate the transverse position of the vehicle back to the setpoint value within this forecast time. If the setpoint value is now to be changed by the lane keeping assistant, high dynamics of the lane changing operation may consequently be achieved through a choice of a short forecast time.

The operating element is preferably formed by a lever which is situated on the steering wheel in such a way that the driver is able to keep his hands on the steering wheel while operating this lever. In a particularly preferred embodiment, this lever is the turn signal switch of the vehicle. The displacement path of a turn signal switch is usually limited in each direction by a stop. Before each stop there is a pressure point that must be overcome in order for the turn signal switch to engage in the "on" position and thus remain turned on until the steering is returned to the neutral position. The sensors which detect the driver's intended dynamics are preferably mounted on the stops and measure, for example, the force with which the driver presses the lever against the stop.

If the driver intends to change lanes and is convinced that the traffic situation will allow this, the driver will first indicate his intent to change lanes to other traffic participants by operating the turn signal switch. If he then moves the turn signal switch beyond the pressure point and against the stop, the lane changing assistant is activated, determining the lane changing dynamics at the same time on the basis of the operating force measured by the sensor. The remaining lane changing operation may then be controlled automatically by the lane changing assistant. When the lane changing procedure is concluded, the turn signal switch returns automatically to the neutral position as usual.

In a modified embodiment, it is also possible to mount the sensors on the pressure points of the turn signal switch.

In a preferred embodiment, the actuating force measured by the sensors is analyzed with time resolution and the steering angle is varied according to the measured actuating force. In this way the driver retains control at least in the initial phase of the lane changing procedure so that he is able to accelerate, decelerate or terminate the lane changing operation entirely, as desired. In the final phase of the lane changing operation, e.g., from the time when the center of the vehicle changes to the other lane, however, the automatic regulation preferably resumes control again so that the transverse position of the vehicle is then regulated at the center of the new lane regardless of the operation of the operating element. If necessary, the driver may then still abort the lane changing procedure by operating the operating element in the opposite direction.

In a modified embodiment, the lane changing procedure is controlled automatically from the beginning and the dynamics is determined in operation of the operating element, e.g., on the basis of the maximum value of the sensor signal, and then remains in effect for the entire lane changing procedure. Instead of exerting a measured force on the sensor, in this case it may be more expedient to measure the time during which the driver is pressing the operating element against the stop. In this way the driver is able to trigger a slow lane changing procedure by touching the operating element. If the driver desires a more rapid lane change, he will hold the operating element in the stop position for a longer period of time. According to another modification, it is conceivable to provide multiple graduated pressure points instead of the stop, in which case overcoming each pressure point will correspond to a lane change with higher dynamics.

The information regarding the driver's intent to change lanes obtained with the help of the operating element and the sensors may also be transmitted to other system components of the vehicle, preferably in digital form via a databus, e.g., a CAN bus, and may then be used, for example, as part of a radar-supported adaptive cruise control to adjust the tracking range of the radar according to the lane changing and/or to intervene in the longitudinal guidance system of the vehicle which belongs to the ADAS system and to increase driving speed—e.g., in a passing operation.

DETAILED DESCRIPTION

Figure 1:
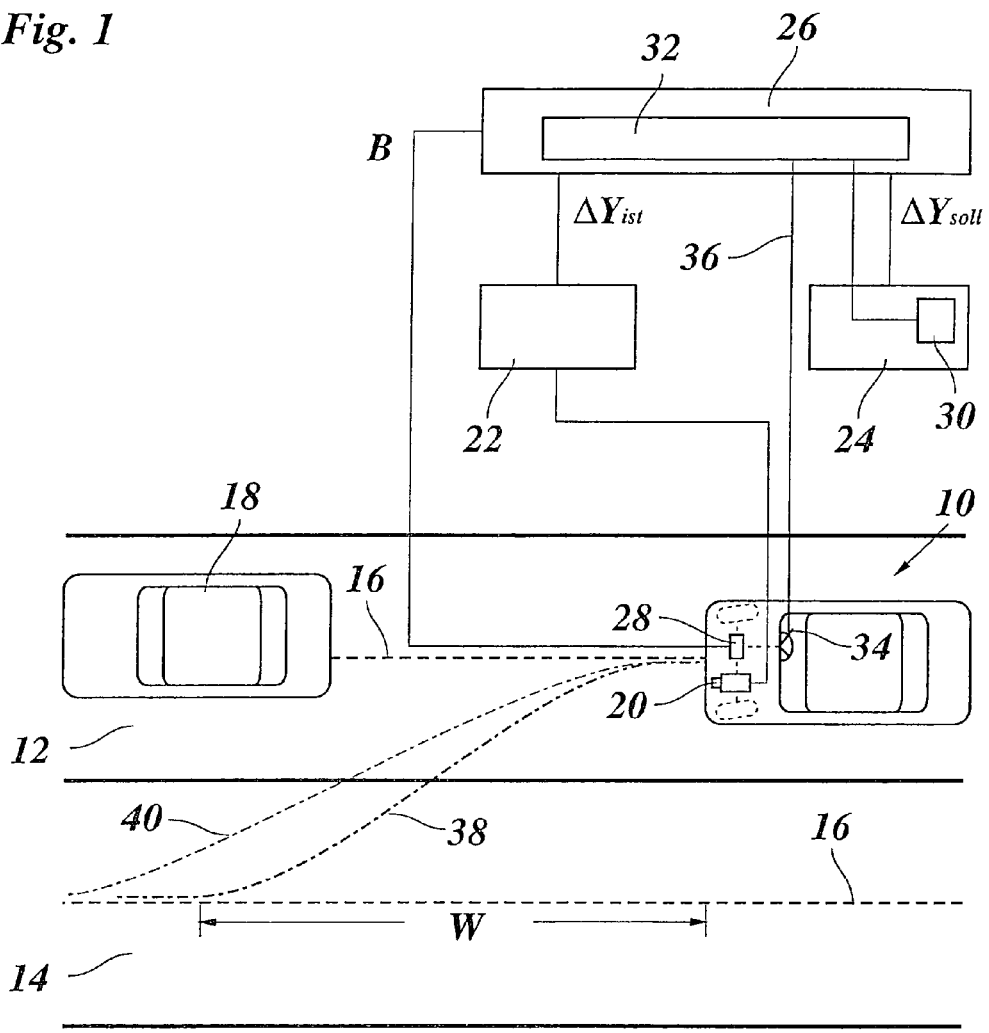
FIG. 1 shows a block diagram of a lane keeping system for a motor vehicle.

FIG. 1 shows schematically in a top view a motor vehicle 10, which is traveling in right lane 12 of a road which also has a passing lane 14. Center 16 of the lane is indicated by a dotted line. Vehicle 10 is now ready to pass a vehicle 18 in front.

Vehicle 10 is equipped with an ADAS system which as a component has a lane keeping system as a subsystem, having the following components illustrated in the form of a block diagram: a sensor device formed by a video camera 20 and an image processing unit 22, a selection device 24 for preselection of a setpoint $\Delta Y_{setpoint}$ for the transverse position of vehicle 10, a regulating device 26 and a steering actuator element 28 which is triggered by a command signal B of regulating device 26 and intervenes in the vehicle steering to regulate the transverse position of vehicle 10 at the setpoint.

The actual position of the vehicle in the direction across its longitudinal axis is detected in the example shown here by the sensor device formed by video camera 20 and image processing unit 22. To do so, image processing unit 22 analyzes the video image recorded by the camera to detect the boundaries of lanes 12, 14 and the position of vehicle 10 in relation to these boundaries. This embodiment of the sensor device is to be understood only as an example and may be replaced by magnetic sensors, for example, which detect magnetic markings for the road surface boundaries. Likewise, the road surface boundaries could also be marked with the help of reflectors which are detected by a vehicle's radar system.

If the position of the lane boundaries in relation to vehicle 10 is known, this data may also be used to determine the width of lane 12 and the location of center 16 of the lane. The sensor device is therefore capable of relaying to regulating device 26 the actual position of vehicle 10, expressed by an actual value $\Delta Y_{actual}$ for the lateral deviation from the center of the lane. On the basis of a comparison of actual value $\Delta Y_{actual}$ with setpoint value $\Delta Y_{setpoint}$, regulating device 26 then forms command signal B, which is sent to steering control element 28. Setpoint value $\Delta Y_{setpoint}$ is also expressed as the lateral deviation from center 16 of the lane. For example, positive values of $\Delta Y_{setpoint}$ correspond to a deviation to the right from the center of the lane and negative values correspond to a deviation to the left from the center of the lane. Preselecting device 24 contains a memory 30 in which the currently valid setpoint value is stored.

Regulating device 26 contains a lane changing assistant 32 as a special function module, which is activated with the help of an operating element 34 situated on the steering wheel of vehicle 10, the lane changing assistant being connected to the operating element via a CAN bus 36. When the driver inputs a command to change lane 14 via operating element 34, lane changing assistant 32 replaces the setpoint value stored previously in memory 30 with a new setpoint value which corresponds to center 16 of lane 14. The transverse position of vehicle 10 is then regulated at the new setpoint value so that the vehicle changes to lane 14 and in doing so follows, for example, a path 38, 40 which is shown with dash-dot lines in FIG. 1. Path 38 is characterized by relatively high dynamics so that the lane changing is completed in a relatively short period of time and within a short distance accordingly while path 40 has lower dynamics.

Figure 2:
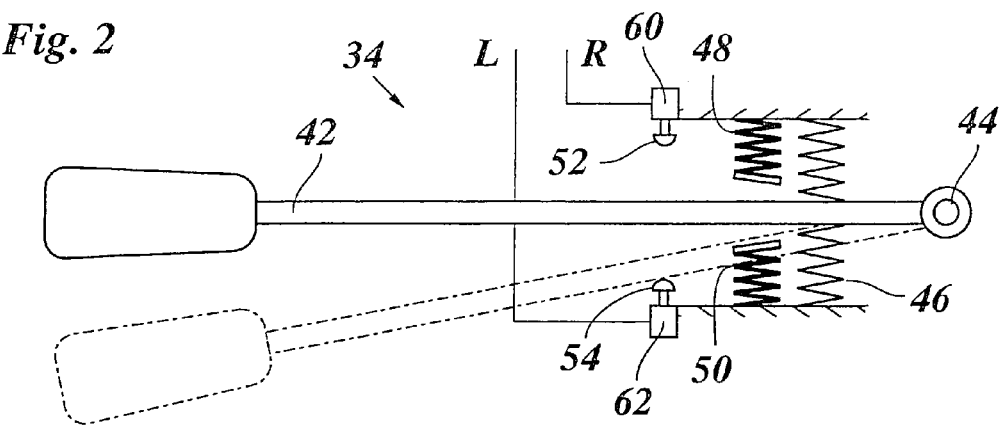
FIG. 2 shows a schematic diagram of an operating element for the lane changing assistant.

The driver is able to influence the dynamics of lane changing with the help of operating element 34 which is shown in greater detail in FIG. 2.

Operating element 34 has as its main component a lever 42 which is situated in an ergonomically advantageous position on the steering wheel of the vehicle and at the same time forms the turn signal switch of the vehicle. Lever 42 is pivotable about a hinge point 44 and is held elastically in the neutral position shown with a solid line in FIG. 2, as represented by a spring 46. Two stronger springs 48, 50 each form a pressure point for keeping the right-hand and/or left-hand turn signal switch "on" continuously. After overcoming the pressure point, the pivoting range of lever 42 is limited in each direction by a stop 52 and/or 54, a sensor 60 and/or 62 being assigned to each stop. Sensors 60, 62 measure the force with which lever 42 is pressed by the driver against the particular stop 52 or 54 and they deliver corresponding signals L, R via the CAN bus to lane changing assistant 32. Signal L and/or R at first produces the change in the setpoint value in memory 30. In addition, the strength of the particular signal indicates the rate at which the lane changing is implemented.

FIG. 1 shows a forecast distance W which determines the behavior of regulating device 26. The regulating device is designed in such a way that the actual position of vehicle 10 is brought into correspondence with the setpoint value within a certain forecast period. The product of this forecast time and the speed of vehicle 10 yields forecast distance W which thus depends on the speed of the vehicle. When the driver in the situation illustrated in FIG. 1 presses lever 42 against stop 54, the setpoint value stored in memory 30 changes from the center of lane 12 to the center of lane 14 and the actual position of the vehicle is adapted to the new setpoint value within forecast distance W. This results in path 38 shown in FIG. 1.

Lane changing assistant 32 in the example shown here is designed so that it varies the forecast time and thus also forecast distance W as a function of the force, as represented by the intensity of signal L and/or R, with which the driver presses lever 42 against the particular stop. When the driver presses lever 42 against stop 54 using a weaker force, the result is a longer forecast time and a greater forecast distance, so that vehicle 10 then follows path 40, for example.

During the first half of the lane changing procedure, i.e., approximately up to the point where vehicle 10 crosses the boundary between lanes 12, 14, the forecast time is adapted continuously to the force exerted by the driver on lever 42 so that the driver is able to determine the precise path as desired. If the driver releases lever 42 during this phase, the original setpoint value corresponding to the center of lane 12 is restored, i.e., the lane changing is aborted. If the driver holds lever 42 on stop 54 until crossing the boundary of the lane, the lane changing procedure is completed automatically. The setpoint remains at the value corresponding to the center of lane 14 and the forecast time is again set at the standard value so that vehicle 10 merges smoothly into the center of new lane 14 without excessive transverse acceleration.

In a modified embodiment, the lane changing procedure is completed with the forecast time corresponding to the maximum value of the force exerted on lever 42.

If the driver would like to abort the lane changing procedure after already crossing the boundary between lanes 12, 14, this may be accomplished by pressing lever 42 against the other stop 52. The system may optionally also be designed in such a way that in general the lane changing procedure may be aborted only in this way. In this case, in aborting the lane changing procedure (to the left), the right-hand turn signal switch is operated, thus ensuring at the same time that the remaining traffic is informed of the driver's altered intent.

The dynamics of the lane changing procedure in other embodiments may also be influenced in other ways instead of via the forecast time and forecast distance W, e.g., by having signal L and/or R determine the rate at which the setpoint gradually migrates from the center of lane 12 to the center of lane 14 or by having the signal L and/or R determine directly the steering angle produced by steering actuator element 28. In the latter case the regulating function of regulating device 26 is suspended during the first phase of the lane changing procedure and replaced by a control and the regulation is resumed only when the vehicle has crossed the lane boundary.

What is claimed is:

1. A lane changing assistant for a motor vehicle, comprising:
    an arrangement for controlling an automatic change of the motor vehicle to a neighboring lane in response to a command by a driver as part of a lane keeping system of the motor vehicle;
    an operating element that is movable in opposite directions out of a neutral position;
    a first sensor allocated to the operating element for a first direction of the operating element out of the neutral position; and
    a second sensor allocated to the operating element for a second direction of the operating element out of the neutral position, wherein:
        each of the first sensor and the second sensor supplies a multi-valued output signal corresponding to an actuation of the operating element and determines dynamics of a lane changing procedure.

2. The lane changing assistant as recited in claim 1, wherein:
    the operating element includes a lever, and
    each of the first sensor and the second sensor measures a force with which the lever is pressed against one of a stop and a pressure point.

3. The lane changing assistant as recited in claim 2, wherein:
    the lever forms a turn signal switch of the motor vehicle.

4. The lane changing assistant as recited in claim 1, wherein:
    each one of the first sensor and the second sensor measure an actuation of the operating element with time resolution and to supply a time-resolved signal as a multi-valued output signal that determines an intensity of an intervention into a steering of the motor vehicle.

5. The lane changing assistant as recited in claim 1, further comprising:
    a regulating device that regulates a transverse position of the motor vehicle at a setpoint value; and
    an arrangement for altering the setpoint value as a response to an output signal of one of the first sensor and the second sensor.

6. The lane changing assistant as recited in claim 5, further comprising:
    an arrangement for analyzing output signals of the first sensor and the second sensor only during an initial phase of the lane changing procedure and then transferring control to the regulating device.

* * * * *